US010400783B1

(12) United States Patent
Allard et al.

(10) Patent No.: US 10,400,783 B1
(45) Date of Patent: Sep. 3, 2019

(54) COMPACT FAN FOR A RECREATIONAL VEHICLE (71) Applicant: DOMETIC SWEDEN AB, Solna (SE)

(72) Inventors: James Allard, Davisburg, MI (US); Mark L. Smith, Buchanan, MI (US); Hari Sunkara, Elkhart, IN (US)

(73) Assignee: Dometic Sweden AB, Solna (SE)

( * ) Notice: Subject to any disclaimer, the term of this patent is extended or adjusted under 35 U.S.C. 154(b) by 501 days.

(21) Appl. No.: 15/198,697

(22) Filed: Jun. 30, 2016

Related U.S. Application Data (60) Provisional application No. 62/187,647, filed on Jul. 1, 2015.

(51) Int. Cl.
| | |
|---|---|
| *F01D 5/14* | (2006.01) |
| *F04D 29/32* | (2006.01) |
| *F04D 19/00* | (2006.01) |
| *F04D 29/66* | (2006.01) |
| *F04D 25/08* | (2006.01) |
| *B60H 1/24* | (2006.01) |
| *B60H 1/00* | (2006.01) |

(52) U.S. Cl.
CPC .......... *F04D 29/327* (2013.01); *B60H 1/24* (2013.01); *F04D 19/002* (2013.01); *F04D 25/08* (2013.01); *F04D 29/667* (2013.01); *B60H 2001/006* (2013.01); *F05B 2240/301* (2013.01); *F05B 2250/02* (2013.01)

(58) Field of Classification Search
CPC ...... F04D 29/327; F04D 19/002; F04D 25/08; F04D 29/667; F04D 29/326; F04D 29/384; F04D 29/386; B60H 1/24; B60H 2001/006; F05B 2240/301; F05B 2250/02

USPC ........................................................ 416/189
See application file for complete search history.

(56) References Cited

U.S. PATENT DOCUMENTS

| | | | |
|---|---|---|---|
| 536,156 A | 3/1895 | Rice | |
| 632,740 A * | 9/1899 | Parker | ................. B64C 27/463 416/228 |
| 1,933,948 A * | 11/1933 | Weber | ................... F04D 29/325 416/234 |
| 2,306,177 A * | 12/1942 | Mattson | .................. B64C 11/18 29/889.61 |
| 2,372,164 A | 3/1945 | Woodhams | |
| D173,436 S * | 11/1954 | Kline et al. | .................. D23/414 |
| 3,016,952 A | 1/1962 | Shero | |
| 3,934,383 A | 1/1976 | Perry et al. | |
| 3,979,148 A | 9/1976 | Martin | |

(Continued)

FOREIGN PATENT DOCUMENTS

| | | |
|---|---|---|
| AU | 359397 | 12/2014 |
| AU | 359396 | 2/2015 |

(Continued)

OTHER PUBLICATIONS

Transmittal Letter of Related Applications Nov. 1, 2016.
(Continued)

*Primary Examiner* — Jason D Shanske
*Assistant Examiner* — Brian Christopher Delrue
(74) *Attorney, Agent, or Firm* — Middleton Reutlinger (57) ABSTRACT

A low-noise, high-volume air mover is used in a recreational vehicle to push air. The air mover is smaller than previous designs used, moves more cubic feet of air than previous designs used, and produces less sound than previous designs used.

21 Claims, 10 Drawing Sheets

(56) References Cited

U.S. PATENT DOCUMENTS

| | | | |
|---|---|---|---|
| 4,038,911 A | 8/1977 | Hart | |
| 4,300,440 A | 11/1981 | Holter | |
| 4,395,939 A | 8/1983 | Hough et al. | |
| 4,615,263 A | 10/1986 | Titterud | |
| 4,633,769 A | 1/1987 | Milks | |
| 4,692,098 A * | 9/1987 | Razinsky | F04D 29/384 415/914 |
| 4,759,270 A | 7/1988 | Linden | |
| 4,872,722 A | 10/1989 | Farmont | |
| 5,375,978 A * | 12/1994 | Evans | B64C 11/26 416/224 |
| 5,407,038 A | 4/1995 | Pedlar | |
| 5,437,541 A * | 8/1995 | Vainrub | F04D 29/326 416/169 A |
| 5,603,607 A * | 2/1997 | Kondo | F04D 29/384 415/119 |
| 5,672,101 A | 9/1997 | Thomas | |
| 5,730,583 A * | 3/1998 | Alizadeh | F04D 19/002 416/169 A |
| 5,797,648 A | 8/1998 | Fiegel et al. | |
| 5,884,589 A * | 3/1999 | Sakamoto | F01P 5/06 123/41.49 |
| 5,906,179 A * | 5/1999 | Capdevila | F04D 29/326 123/41.49 |
| 5,984,405 A | 11/1999 | Ciacci | |
| D421,798 S * | 3/2000 | Liang | D23/370 |
| 6,116,856 A * | 9/2000 | Karadgy | B64C 11/00 29/888.025 |
| 6,179,034 B1 | 1/2001 | Fuss | |
| 6,183,196 B1 * | 2/2001 | Fujinaka | F04D 19/002 415/119 |
| 6,241,474 B1 * | 6/2001 | Alizadeh | F04D 29/326 416/189 |
| 6,254,342 B1 * | 7/2001 | Fujinaka | F04D 25/08 415/119 |
| D446,295 S * | 8/2001 | Williams | D23/370 |
| 6,287,078 B1 * | 9/2001 | Min | F04D 29/326 416/189 |
| 6,347,484 B1 | 2/2002 | Swanger | |
| 6,438,800 B1 | 8/2002 | Narang et al. | |
| 6,442,896 B1 | 9/2002 | Chapin, III | |
| 6,554,574 B1 * | 4/2003 | Spaggiari | F04D 29/384 415/119 |
| 6,558,123 B1 * | 5/2003 | Spaggiari | F04D 29/384 415/119 |
| 6,908,287 B2 * | 6/2005 | Cho | F04D 29/326 415/119 |
| 6,948,910 B2 * | 9/2005 | Polacsek | F03D 1/0608 416/1 |
| 7,021,006 B2 | 4/2006 | Farrar et al. | |
| 7,044,712 B2 * | 5/2006 | Cho | F04D 29/384 416/169 A |
| 7,121,807 B2 * | 10/2006 | Cho | F04D 29/384 416/242 |
| 7,210,910 B1 * | 5/2007 | Parker | F04D 25/088 416/223 R |
| 7,419,368 B2 * | 9/2008 | Milks | F04D 25/08 310/154.32 |
| 7,455,502 B2 * | 11/2008 | Spaggiari | F04D 25/082 416/93 R |
| 7,585,155 B2 * | 9/2009 | Park | F04D 29/326 416/189 |
| 7,731,574 B2 | 6/2010 | Milks | |
| 7,762,765 B2 | 7/2010 | Milks | |
| 7,762,769 B2 * | 7/2010 | Stevens | F04D 29/326 415/220 |
| 7,762,778 B2 * | 7/2010 | Purvines | B23P 15/006 416/186 A |
| D645,134 S * | 9/2011 | Lee | D23/411 |
| D654,920 S | 2/2012 | Wang et al. | |
| 8,177,496 B2 * | 5/2012 | Wilson | F01D 5/141 415/181 |
| 8,317,478 B2 * | 11/2012 | Higo | F04D 29/325 264/336 |
| D681,187 S * | 4/2013 | Hu | D23/413 |
| D681,188 S * | 4/2013 | Hu | D23/413 |
| D681,800 S * | 5/2013 | Hu | D23/413 |
| D723,152 S * | 2/2015 | Xu | D23/370 |
| D725,257 S * | 3/2015 | Huang | D23/370 |
| D726,300 S * | 4/2015 | DeFilippis | D23/414 |
| D734,845 S * | 7/2015 | Xu | D23/370 |
| D736,368 S * | 8/2015 | Xu | D23/370 |
| D742,294 S | 11/2015 | Iancului | |
| 9,399,183 B2 | 7/2016 | McVay et al. | |
| D762,528 S | 8/2016 | Allard et al. | |
| 9,557,072 B2 | 1/2017 | Tolinski et al. | |
| D782,939 S | 4/2017 | Allard et al. | |
| D782,940 S | 4/2017 | Allard et al. | |
| D782,941 S | 4/2017 | Allard et al. | |
| D787,037 S * | 5/2017 | Allard | D23/370 |
| 9,803,649 B2 * | 10/2017 | Ragg | F04D 29/384 |
| D806,223 S * | 12/2017 | Allard | D23/370 |
| 9,841,032 B2 * | 12/2017 | Henner | F04D 29/384 |
| D814,008 S * | 3/2018 | Munz | D23/370 |
| 9,970,453 B2 * | 5/2018 | Henner | F04D 29/384 |
| D820,966 S * | 6/2018 | De Filippis | D23/370 |
| 10,093,152 B2 * | 10/2018 | Allard | B60H 1/262 |
| 2003/0012656 A1 * | 1/2003 | Cho | F04D 29/326 416/235 |
| 2003/0124001 A1 * | 7/2003 | Chen | F04D 25/066 417/356 |
| 2004/0165986 A1 * | 8/2004 | Parker | F04D 29/164 415/220 |
| 2004/0175270 A1 | 9/2004 | Havel et al. | |
| 2005/0003751 A1 | 1/2005 | Thomas | |
| 2005/0180849 A1 * | 8/2005 | Chen | F04D 29/325 415/220 |
| 2005/0207894 A1 * | 9/2005 | Park | F04D 29/326 416/223 R |
| 2005/0238486 A1 * | 10/2005 | Stagg | B29C 33/3835 415/179 |
| 2006/0039792 A1 * | 2/2006 | Ferte | B23K 20/122 416/232 |
| 2007/0020103 A1 * | 1/2007 | Spaggiari | F04D 29/386 416/223 R |
| 2007/0031250 A1 * | 2/2007 | Suzuki | F04D 29/384 415/220 |
| 2007/0166165 A1 * | 7/2007 | Lee | F04D 29/384 416/189 |
| 2007/0201982 A1 * | 8/2007 | Neumeier | F04D 29/325 416/142 |
| 2008/0008592 A1 * | 1/2008 | Gerard | F04D 29/522 416/203 |
| 2008/0044292 A1 * | 2/2008 | Spaggiari | F04D 29/329 416/243 |
| 2008/0139101 A1 | 6/2008 | Bickel et al. | |
| 2008/0156282 A1 * | 7/2008 | Aschermann | F04D 29/386 123/41.49 |
| 2008/0210409 A1 | 9/2008 | Saksager | |
| 2009/0155076 A1 * | 6/2009 | Jarrah | F04D 29/326 416/182 |
| 2010/0056035 A1 | 3/2010 | Hua | |
| 2010/0068060 A1 | 3/2010 | Ota et al. | |
| 2010/0086405 A1 * | 4/2010 | Higo | F04D 29/325 416/189 |
| 2010/0260630 A1 * | 10/2010 | Bilodeau | F04D 29/263 417/423.1 |
| 2011/0094460 A1 * | 4/2011 | Hoskins | F04D 29/164 123/41.49 |
| 2011/0135494 A1 * | 6/2011 | Nicgorski | F04D 29/329 416/93 R |
| 2011/0236211 A1 | 9/2011 | Schneider et al. | |
| 2012/0014800 A1 * | 1/2012 | Kang | F04D 29/384 416/193 R |
| 2012/0224988 A1 * | 9/2012 | Maier | F04D 25/08 417/423.1 |
| 2012/0244000 A1 * | 9/2012 | Turcas | B29C 45/0025 416/189 |

(56) References Cited

U.S. PATENT DOCUMENTS

| | | | | |
|---|---|---|---|---|
| 2013/0028747 A1* | 1/2013 | Henner | ............... | F04D 29/384 416/242 |
| 2013/0115093 A1* | 5/2013 | Tharp | ............... | F01D 5/12 416/226 |
| 2013/0147312 A1* | 6/2013 | Qin | ............... | H02K 13/006 310/234 |
| 2013/0323062 A1* | 12/2013 | Henner | ............... | F04D 29/384 416/195 |
| 2014/0030104 A1 | 1/2014 | Lee et al. | | |
| 2014/0056710 A1* | 2/2014 | Henner | ............... | F04D 29/384 416/189 |
| 2014/0119922 A1* | 5/2014 | Nakano | ............... | F04D 29/30 416/189 |
| 2014/0334952 A1* | 11/2014 | Ziegler | ............... | F04D 25/0606 417/423.1 |
| 2015/0064011 A1* | 3/2015 | Xu | ............... | F04D 19/002 416/189 |
| 2015/0078937 A1* | 3/2015 | Crevel | ............... | F04D 25/0613 417/423.1 |
| 2015/0167677 A1* | 6/2015 | Jung | ............... | F04D 19/002 415/208.2 |
| 2015/0352924 A1 | 12/2015 | Allard et al. | | |
| 2016/0200174 A1 | 7/2016 | Tremer et al. | | |
| 2017/0261000 A1* | 9/2017 | Komura | ............... | F04D 29/384 |
| 2017/0342990 A1* | 11/2017 | Martens | ............... | F03G 7/10 |
| 2018/0030996 A1* | 2/2018 | Schilling | ............... | F04D 29/384 |
| 2018/0066521 A1* | 3/2018 | Sawada | ............... | F01D 5/141 |
| 2018/0087784 A1* | 3/2018 | Sawada | ............... | F04D 29/181 |

FOREIGN PATENT DOCUMENTS

| | | |
|---|---|---|
| AU | 367696 | 3/2016 |
| AU | 367699 | 3/2016 |
| AU | 367700 | 3/2016 |
| AU | 367701 | 3/2016 |
| CA | 159763 | 11/2014 |
| CA | 166627 | 4/2016 |
| CA | 166057 | 9/2016 |
| CA | 170268 | 9/2016 |
| CN | 3545706 | 12/2015 |
| DE | 19607931 | 2/1998 |
| EM | 002591586 | 2/2015 |
| EM | 002919936 | 12/2015 |
| WO | 2015191029 | 12/2015 |

OTHER PUBLICATIONS

Canadian Design Patent Application 166057 "Fan" filed Dec. 18, 2015. Dec. 18, 2015.
Canadian Design Patent Application 170268 "Fan" filed Dec. 18, 2015. Dec. 18, 2015.
Design U.S. Appl. No. 29/532,130 "Fan" filed Jul. 1, 2015.
Fantastic ® Vent Fan with fan blade Model No. 8138-81 Feb. 13, 2015.
Canadian Patent Application No. 2,951,956 entitled "Shrouded Roof Vent for a Vehicle" entered national stage on Dec. 9, 2016.
Canadian Design Patent Application No. 174116 entitled "Roof Fan Shroud" filed Apr. 11, 2017.
U.S. Patent and Trademark Office International Search Report for PCT/US2014/041566 dated Oct. 24, 2014.
U.S. Appl. No. 15/292,239 entitled "Roof Fan Assembly" filed Oct. 13, 2016.
Design U.S. Appl. No. 29/580,801 entitled "Roof Fan Shroud" filed Oct. 13, 2016.
Design U.S. Appl. No. 29/588,249 entitled "Fan" filed Dec. 19, 2016.
MaxxAir Fans, MaxxFan 4301K and 4401K; Jan. 22, 2016.
Dometic Product Catalog 2016, Fan-Tastic Vent Models; EZ-Breeze; Ultra Breeze. pp. 90-91. 2016.

\* cited by examiner

COMPACT FAN FOR A RECREATIONAL VEHICLE

CLAIM TO PRIORITY

This Non-Provisional Patent Application claims priority to and benefit under 35 U.S.C. § 119 of Provisional Patent Application having application Ser. No. 62/187,647 filed Jul. 1, 2015, titled "Compact Fan for a Recreational Vehicle", all of which is incorporated by reference herein.

CROSS-REFERENCE

Cross-reference is made to U.S. Design Patent App. No. 29/532,130 entitled "Fan," which was filed on Jul. 1, 2015 and is expressly incorporated by reference herein.

BACKGROUND

The present disclosure is related to air fans. More specifically, the present disclosure is related to compact air fans installed in a vehicle configured move a large volume of air while minimizing noise.

The use of fans to move air in enclosed spaces presents challenges with regard to noise and efficiency. Moving large volumes of air may create noise and be inefficient as the movement of air requires the air to be moved by fan blades or other vanes that result in movement of the air over the surfaces that are designed to cause movement of the air. This relative movement results in noise that is complemented by the noise of the moving parts in the fan assembly. In addition, energy is required to move the air and larger volumes of air to be moved require a more severe surface air foil to move the air. This may result in larger losses and more noise, rendering the fan to be noisier and less efficient than optimal.

The effects of the loss of efficiency and increase in noise are exacerbated in an environment where there is need to conserve power, such as a vehicle, for example. In recreational vehicles and marine vehicles, there is a need to move air at times when mains power is not available. While the needs for moving air remain the same, there is a need to conserve energy to reduce the load on any generators or energy storage devices.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which, alone or in any combination, may comprise patentable subject matter:

According to a first aspect of the present disclosure, a fan blade design comprises a fan blade with a first end and a second end, the first end configured to couple to a hub of the fan and the second end configured to couple to a hoop of the fan. The fan blade also comprises a leading edge extending between the first end and the second end near a motor side of the fan. The fan blade still further comprises a trailing edge extending between the first end and the second end near a cover side of the fan. The fan blade has a first blade width and a first blade angle at the first end and a second blade width and a second blade angle at the second end.

In some embodiments the fan blade further comprises a leading fin that flares out from the leading edge of the fan blade near the second end configured to force air toward the trailing edge of the fan when the fan is rotating in a forward direction.

In some embodiments the fan blade further comprises a trailing fin that flares out from the trailing edge of the fan blade near the second end configured to force air away from the fan when the fan is rotating in a forward direction.

In some embodiments the fan blade further comprises a number of notches cut into the leading edge near the second end of the fan blade and a notch cut into the trailing edge near the second end of the fan blade. The notches are configured to reduce the air turbulence experienced by the fan as it slices through the air.

In some embodiments the fan blade further comprises a number of notches cut into the trailing edge near the second end of the fan blade.

In some embodiments the second blade width is larger than the first blade width.

In some embodiments the fan blade is progressively contoured as it extends from the first end to the second to form a continuous blade.

In some embodiments the first blade angle is different than the second blade angle.

In some embodiments the leading edge includes a first relief indent near the second end that defines a point where the leading edge generally flares outward away from a central axis of the blade defining a leading fin.

In some embodiments the leading edge has a generally convex shape as it extends from the first end to the first relief indent.

In some embodiments the trailing edge includes a second relief indent near the second end that defines a point where the trailing edge generally flares outward away from a central axis of the blade defining a trailing fin.

In some embodiments the trailing edge has a generally convex shape as it extends from the first end to the second relief indent.

In some embodiments, a cross-section of the fan blade at the second end is arcuate in shape and extends between a motor side of the hoop and a cover side of the hoop at the second blade angle and a cross-section of the fan blade at the first end is bulbous in shape and extends between a motor side of the hub and a cover side of the hub at the second blade angle.

According to a second aspect of the present disclosure, a fan comprises a central hub, an outer hoop, and a number of blades. The central hub has a generally annular shape and a hub radius configured to rotate about a motor axis. The outer hoop has a generally annular shape and a hoop radius configured to rotate about the motor axis. The hoop radius is larger than the hub radius. The central hub and the outer hoop are coplanar and each has a motor side a cover side that is away from the motor side. The blades extend from the central hub to the outer hoop. The blades are progressively contoured as they extend from the hub to the hoop. The blades include a first end and a second end, the first end configured to couple to the central hub and the second end configured to couple to the outer hoop. The blades include a leading edge extending between the first end and the second end near the motor side of the fan and a trailing edge extending between the first end and the second end near the cover side of the fan.

In some embodiments, the central hub defines a hub height distance between the motor side and the cover side of the fan, and the outer hoop defines a hoop height distance between the motor side and the cover side of the fan. In some embodiments, the hoop height is similar to the hub height.

In some embodiments the blades have a blade width larger than the hub height.

In some embodiments the blades extend from the motor side of the hub to the cover side of the hub at a first blade pitch angle, the first blade pitch angle configured to move air from one side of the fan to another side of the fan.

In some embodiments, the blades extend from the motor side of the hoop to the cover side of the hoop at a second blade pitch angle, the second blade pitch angle configured to move air from one side of the fan to another side of the fan.

In some embodiments, a hub height is smaller than a hoop height, the motor side of the hub is parallel with and coplanar with the motor side of the hoop and the cover side of the hub is parallel with the cover side of the hoop.

All of the above outlined features are to be understood as exemplary only and many more features and objectives of a compact fan may be gleaned from the disclosure herein. Additional features, which alone or in combination with any other feature(s), including those listed above and those listed in the claims, may comprise patentable subject matter and will become apparent to those skilled in the art upon consideration of the following detailed description of illustrative embodiments. Therefore, no limiting interpretation of this summary is to be understood without further reading of the entire specification, claims and drawings, included herewith.

BRIEF DESCRIPTION OF THE DRAWINGS

The detailed description particularly refers to the accompanying figures in which.

DETAILED DESCRIPTION OF THE DRAWINGS

Figure 1:
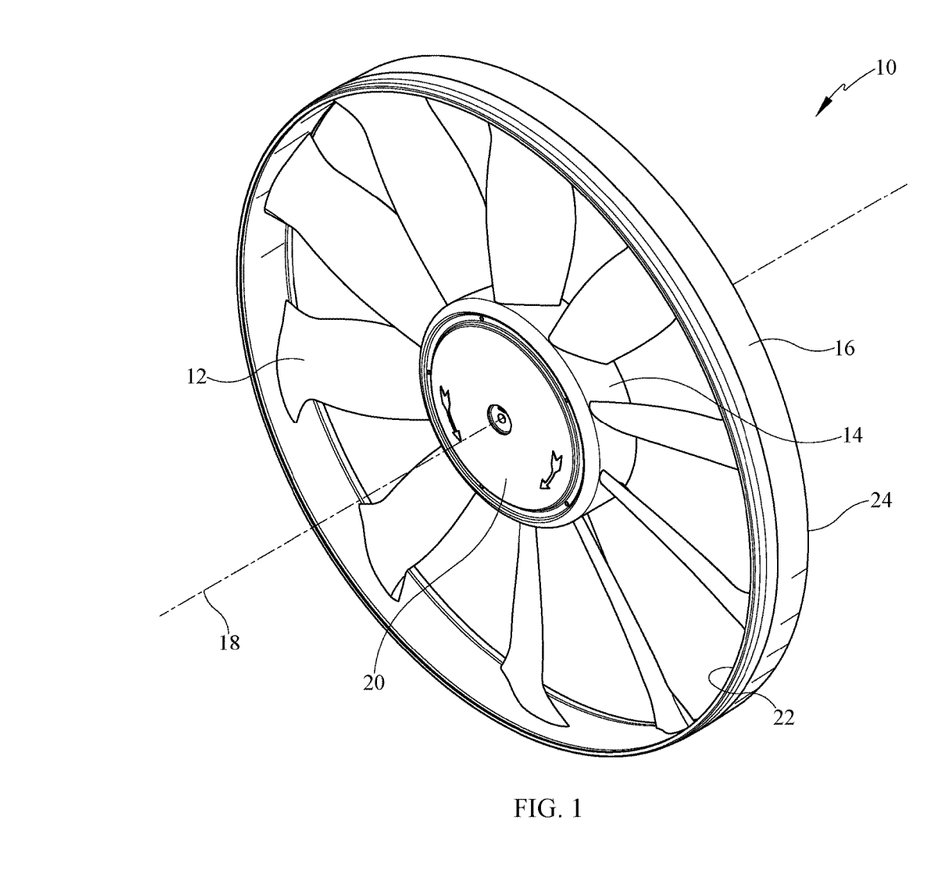
FIG. 1 is a front perspective view of a compact fan in accordance with the present disclosure.

A low-noise, high-volume compact fan 10 for use in a recreational vehicle is shown in FIG. 1. In some applications, a recreational vehicle or another structure, such as a building, an airplane, or another vehicle, for example, includes a fan to circulate air through a closed space. It is desired in many applications that the fan be as small as possible, as quiet as possible, but still move a high-volume of air. The fan design 10 moves a high-volume of air relatively quietly, while being limited in size.

Two important parameters of components that are considered when incorporating a specific component into a recreational vehicle are the size of the component and the weight of the component. However, a smaller fan design is not always better fan design because the size of the fan is relates to the fans ability to move air. A prior art compact fan design included a fan with a diameter of 12.15 inches, that could, on average, moves 694 cubic feet per minute (CFM) of air and generates 37.5 decibels (dB) of sound when the rotor is turning at approximately 1300 revolutions per minute (RPM). The prior art fan blade design includes a tapered blade with no fins.

The fan 10 of the present disclosure has a number of blades 12 extending radially outward from a central hub 14 to an outer hoop 16 for rotation about a motor axis 18. The central hub 14 is annular in shape with a cover 20 covering the middle portion of the hub 14. The hoop 16 is revolved annularly about the hub 14 such that the fan 10 is shaped like a cylinder extending axially along the motor axis 18. A cover end 22 defines the end of the cylinder closest to the cover 20 and a motor end 24 defines the end of the cylinder away from the cover 20, or the end of the fan that attaches to the motor (not shown). The cover end 22 and the motor end 24 define parallel planes.

Figure 2:
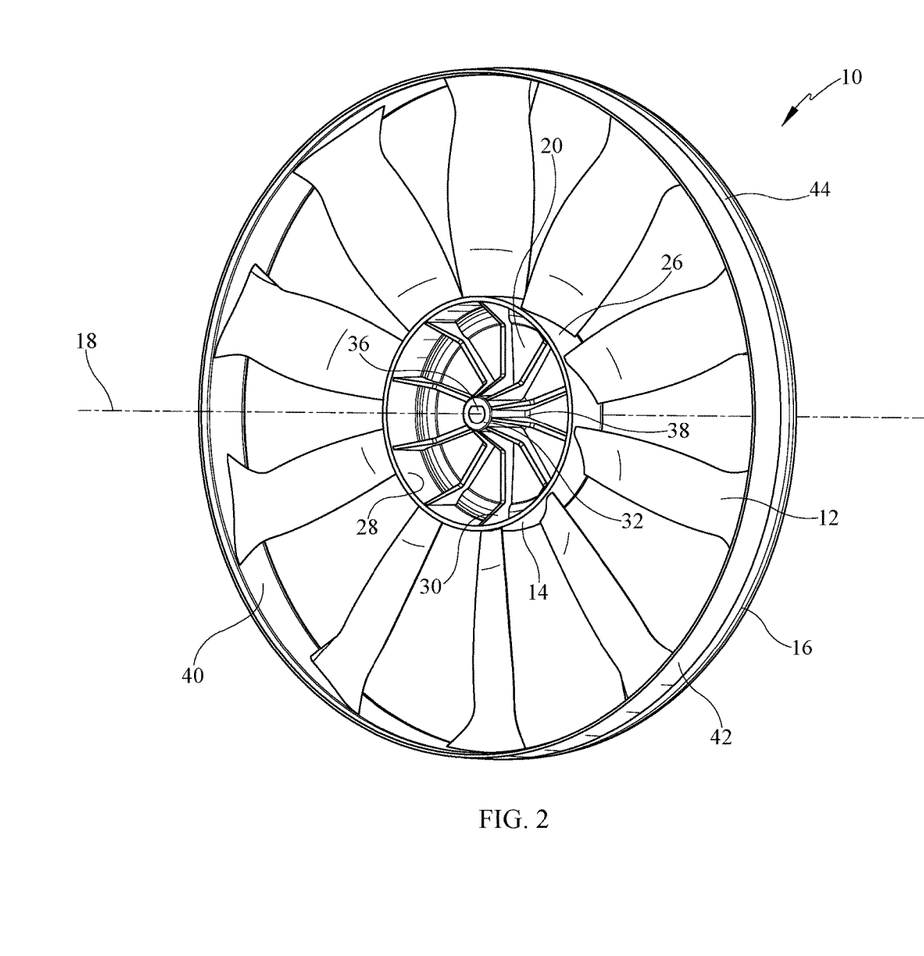
FIG. 2 is a perspective view of the motor side of the compact fan shown in FIG. 1.

As shown in FIG. 2, the hub 14 has a hub outer surface 26 and a hub inner surface 28. The hub outer surface 26 is coupled to the plurality of blades 12, while the hub inner surface 28 is coupled to a plurality of ribs 30. The ribs 30 support the central hub 14 and extend radially inward from the hub inner surface 28 to a motor mount 32. The motor mount 32 extends parallel to the motor axis 18. A first side 34 of the motor mount includes an aperture 36 shaped and configured to receive a rotor of a motor, and a second side 38 of the motor mount includes an aperture (not shown) shaped to receive the cover 20. While the cover 20 is removably engaged with the fan 10, the cover 20 hides second side 38.

The outer hoop 16 is annular in shape, forming a continuous ring. An inner hoop surface 40 is coupled to the plurality of blades 12 and an outer hoop surface 42 is configured to be positioned proximate a fan housing (not shown) to allow movement of the fan 10. The outer hoop surface 42 includes piloting features 44 that engage with a fan housing (not shown) to maintain the rotational stability of the fan as it is driven by the motor.

Figure 3A:
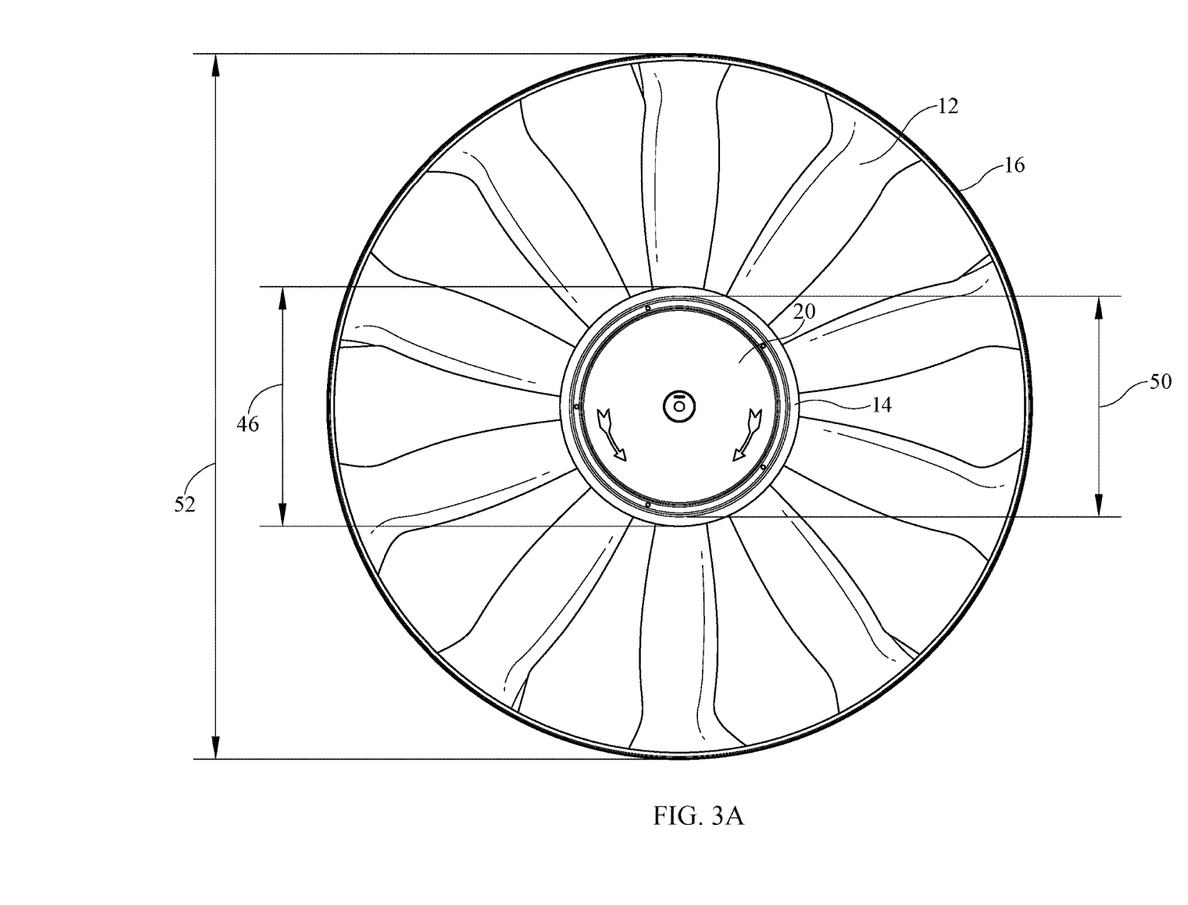
FIG. 3a is a front side elevation view of the compact fan shown in FIG. 1 in accordance with the present disclosure.
Figure 3B:
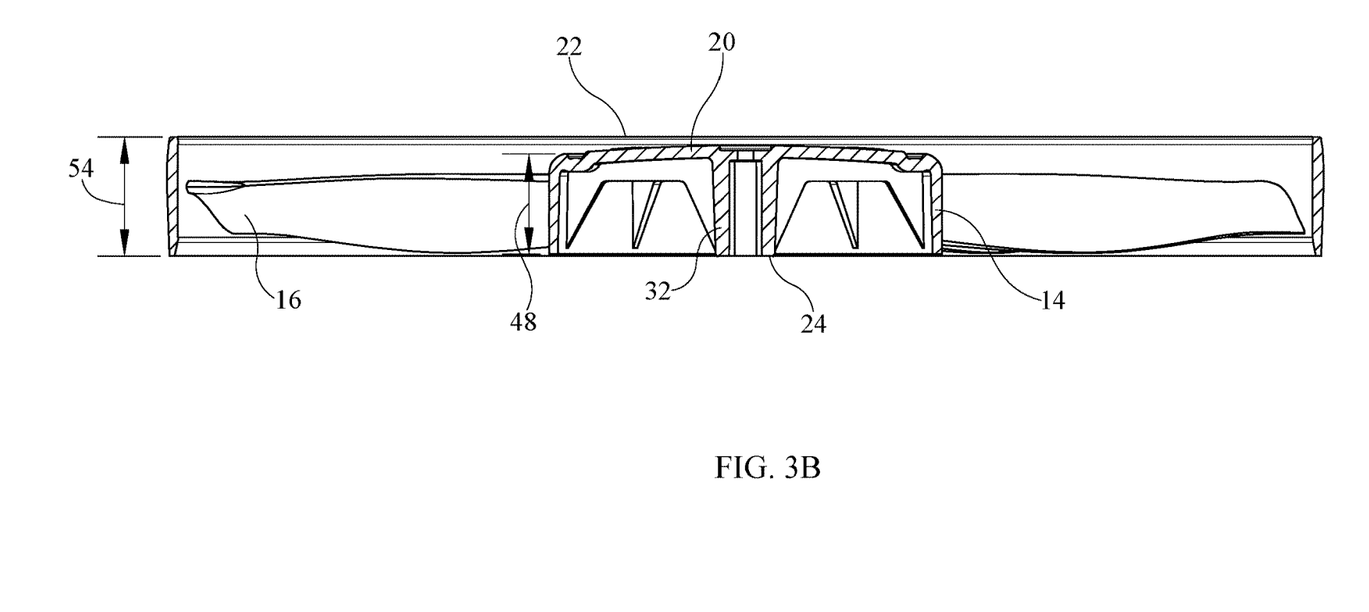
FIG. 3b is a side cross-section view of the compact fan shown in FIG. 1 in accordance with the present disclosure.

The central hub 14 is annular in shape, forming a ring with a hub diameter 46 and a hub height 48, shown in FIGS. 3A and 3B. The hub height 48 is defined as the distance between the cover end 22 and the motor end 24 of the fan 10, extending along the motor axis 18. The cover 20 is shaped like a disc and defines a cover diameter 50 that is similar to the hub diameter 46. The cover 20 removably engages with the motor mount 32 and is used to secure the fan 10 to a motor (not shown). The hoop 16 has a hoop diameter 52 and a hoop height 54. The hoop height 54 is defined as the distance between the cover end 22 and the motor end 24. The hoop diameter 52 is larger than the hub diameter 46 and defines the overall diameter of the fan 10.

Figure 4:
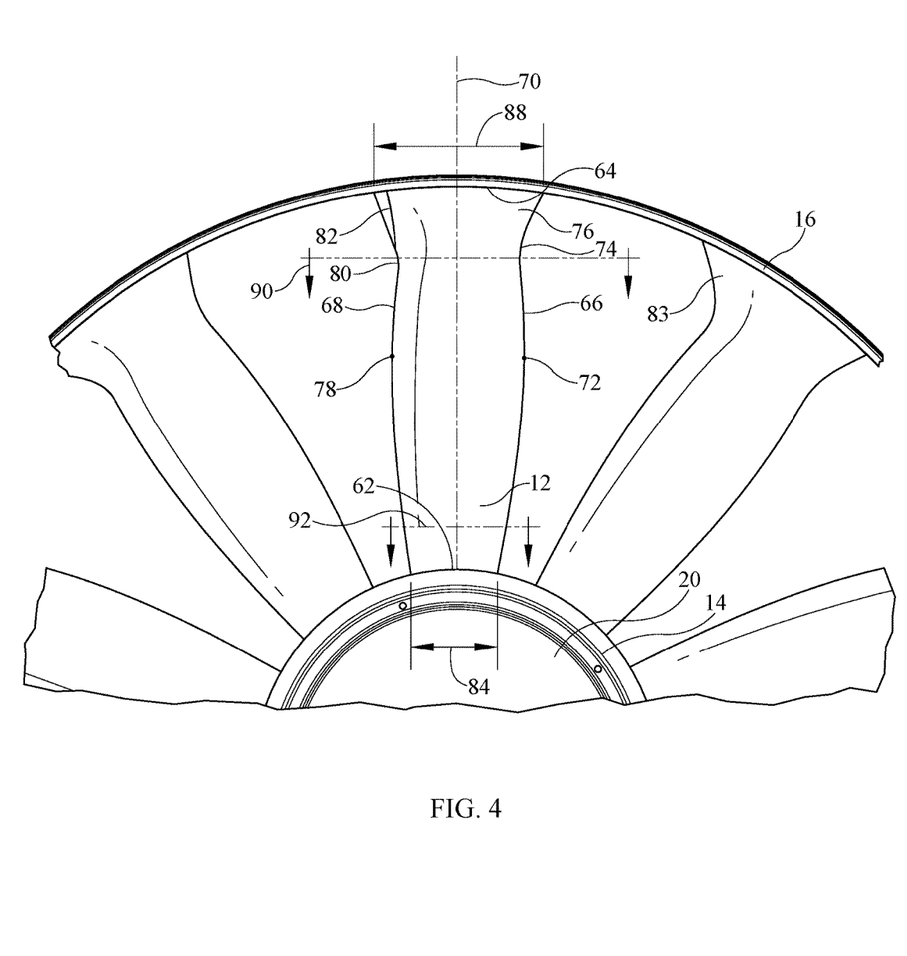
FIG. 4 is a front side elevation view of a blade of the compact fan in accordance with the present invention.

A profile of a fan blade 12 is shown in FIG. 4. The blade 12 has a progressively contoured profile as the blades extend from the hub 14 to the hoop 16. The blade 12 includes a hub end 62, a hoop end 64, a leading edge 66, and a trailing edge 68. The blade 12 defines a blade axis 70 that extends radially outward from the hub 14 along the central part of the blade 12 between the leading edge 66 and the trailing edge 68.

As the leading edge 66 progresses from the hub 14, the leading edge 66 diverges from the blade axis 70. At a mid-point 72 between the hub 14 and the hoop 16, the leading edge 66 turns and begins to converge back toward the blade axis 70 causing the leading edge 66 to have a convex shape. A relief indent 74 is formed in the leading edge 66 and defines a point where the leading edge 66 changes directions and flares outward, away from the blade axis 70 and forms a leading edge fin 76.

Similar to the leading edge 66, as the trailing edge 68 progress from the hub 14 to the hoop 16, it diverges from the blade axis 70. At a mid-point 78 between the hub 14 and the hoop 16, the trailing edge 68 turns and converges back toward the blade axis 70 causing the trailing edge 68 to have a convex shape. A relief indent 80 is formed in the trailing edge 68, and defines a point where the trailing edge changes direction and flares outward, away from the blade axis 70 and forms a trailing edge fin 82.

The hub end 62 of the blade has a first blade width 84 and a first blade angle 86. The first blade width 84 is defined as the distance between a leading edge 66 of the blade to a trailing edge 68 of the blade. The leading edge 66 of the blade interfaces with the hub 14 at a point near the motor end 24 of the fan and the trailing edge 68 of the blade interfaces with the hub at a point near the cover end 22 of the fan. At the hoop end 64 the blade 12 has a second blade width 88, different than the first blade width 84, and a second blade angle 89, different than the first blade angle 86. The fins 76 and 82 are included in the second blade width 88. The leading edge fin 76 and the trailing edge fin 82 increases the air-flow volume of the fan by forcing air downward, while reducing the noise generated by the fan. The blade angle and the fan blade contours between the leading edge and the trailing edge of the blade and along the entire length of the blade to efficiently direct the air flow from the leading edge to the trailing edge and increase the air-flow volume of the fan. Further, the trailing edge fins 83 of adjacent blades are at an angle from the radial axis of the blade 12 which is greater than fin 82. The blades have these alternating trailing edge angles.

Figure 5:
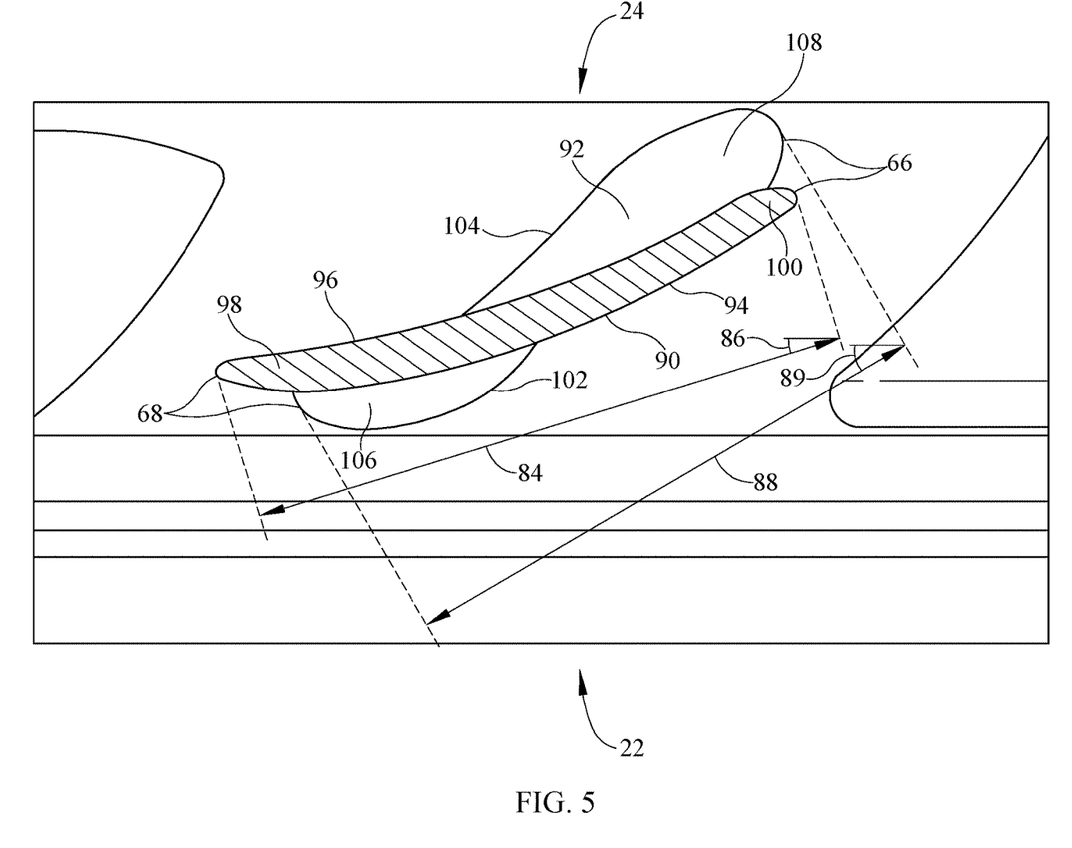
FIG. 5 is a variable cross-section view looking down the length of a blade of the compact fan in accordance with the present disclosure.

A variable cross-section looking down the length of the blade 12 is shown in FIG. 5. The shaded cross-section closest to the viewer is a hoop-end cross-section 90 of the blade 12, and the cross-section away from the viewer is a hub-end cross-section 92 of the blade 12. The motor end 24 of the fan is oriented to be at the top of FIG. 4, and the cover end 22 of the fan 10 is oriented to be at the bottom of FIG. 4.

Referring now to the hoop-end cross-section 90 of FIG. 5, the hoop-end cross-section 90 is generally arcuate in shape. A first lower surface 94 and a first upper surface 96 of the hoop-end cross-section 90 converge and terminate at the leading edge 66 at one end, and the surfaces 94, 96 converge and terminate at the trailing edge 68 at the opposite end. The first lower surface 94 is contoured in a bow shape as it extends, at an angle, from the cover end 22 and the trailing edge 68 to the motor end 24 and the leading edge 66. At the trailing edge 68, the first upper surface 96 diverges from the first lower surface 94, widening the blade 12. The first upper surface 96 extends between the trailing edge 68 and the leading edge 66 in a bow shape until the first upper surface 96 converges with the first lower surface 94 at the leading edge 66. The first lower surface 94 and the first upper surface 96 define a first tapered portion 98 of the blade at trailing edge 68 and define a second tapered portion 100 at leading edge 66.

Referring now to the hub-end cross-section 92 of FIG. 5, the hub-end cross-section 92 extends from the trailing edge 68 and terminates at the leading edge 66. The hub-end cross-section 92 includes a second lower surface 102 and a second upper surface 104 that extend between the trailing edge 68 and the leading edge 66. The second lower surface 102 extends from the trailing edge 68 parallel to the plane defined by the cover end 22 of the fan 10 until the second lower surface 102 angles upwardly, such that it extends linearly toward the leading edge 66 located near the motor end 24 of the fan. At the trailing edge 68, the second lower surface 102 and the second upper surface 104 converge and define a third tapered portion 106. The second upper surface 104 extends from the trailing edge 68 and third tapered portion 106 parallel to the plane defined by the cover end 22 of the fan 10 until the second upper surface 104 angles upwardly toward the leading edge 66 and the motor end 24 of the fan. The upward angle of the second upper surface 104 is greater than the upward angle of the second lower surface 102, such that the second upper surface 104 diverges from the second lower surface 102, relative to the planes created by cover end 22 and motor end 24. At the leading edge 66, the second lower surface 102 and the second upper surface 104 converge and define a fourth tapered portion 108, which is bigger than the third tapered portion 106.

The blade 12 is continuously contoured as it extends between the hub end 62 and the hoop end 64 such that there is a smooth transition between the geometry of the hoop-end cross-section 90 and the geometry of the hub-end cross-section 92. The first lower surface 94 and the second lower surface 102 are actually different representations of the same lower surface at different points on the blade 12, and the lower surface of blade 12 is continuously contoured between the hub end 62 and the hoop end 64. Similarly, the first upper surface 96 and the second upper surface 104 form one continuous upper surface of the blade 12, and the upper surface is continuously countered between the hub end 62 and the hoop end 64.

The first blade width 84 and the first blade angle 86 can be seen in FIG. 5. The first blade width 84 is generally defined as the linear distance between the leading edge 66 and the trailing edge 68 on the hoop-end cross-section 90. The first blade angle 86 is the angle between the plane defined by the first blade width 84 and the plane defined by either the cover end 22 or the motor end 24 of the fan. The second blade width 88 and the second blade angle 89 are also seen in FIG. 4. The second blade width 88 is generally defined as the linear distance between the leading edge 66 and the trailing edge 68 of the blade at the hub-end cross-section 92. The second blade angle 89 is the angle between the plane defined by the second blade width 88 and the plane defined by either the cover end 22 or the motor end 24 of the fan.

Figure 6:
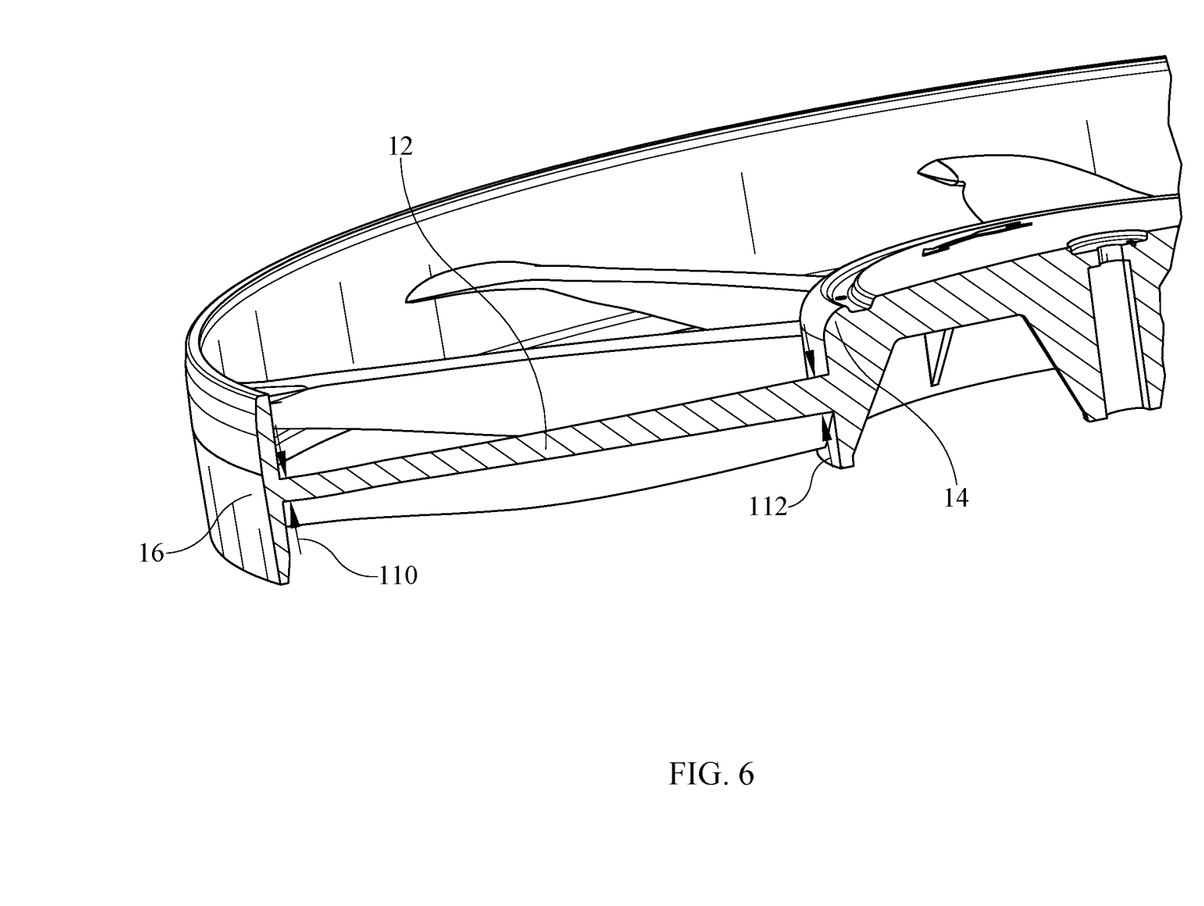
FIG. 6 is a cross-sectional view of the blade of the compact fan as it extends from the hub of the fan to the hoop of the fan in accordance with the present disclosure.

A cross-sectional view of the blade 12 as it extends from the hub 14 to the hoop 16 is shown in FIG. 6. A hoop blade height 110 is defined at the hoop end 64 of the blade, and a hub blade height 112 is defined at the hub end 62 of the blade 12. The hub blade height 112 is greater than the hoop blade height 110, and the height of the cross-section of the blade 12 decreases as the blade extends from the hub end 62 to the hoop end 64.

In the illustrative embodiment, the compact fan design has a diameter of 11.42 inches, the fan can move about 712 CFM of air generating about 36.6 dB when the rotor is turning at approximately 1300 RPM. The blades 12 of the illustrative compact fan design add the fins 76, 82 which result in an increase in air movement of 17.8 CFM over the prior art fan design, and the sound level 0.91 dB lower than the prior art fan design. The rotor speed is exemplary and non-limiting. One skilled in the art will realize that motors may run at differing speeds and that the exemplary reference to 1300 RPM throughout the present disclosure is merely one speed at which testing occurred. Further, one skilled in the art should recognize from this teaching that higher speeds may result in higher sound levels and lower speeds may result in lower sound levels, all of which are within the scope of the present disclosure and claims. In these embodiments, one of skill in the art will also realize that any speeds, the instant compact fan will produce lower sound levels while moving at least as much, or more, air than prior art fans.

The design of the presently disclosed embodiment of fan 10 is the result of the comparison of alternative designs and results as discussed below.

Figure 7:
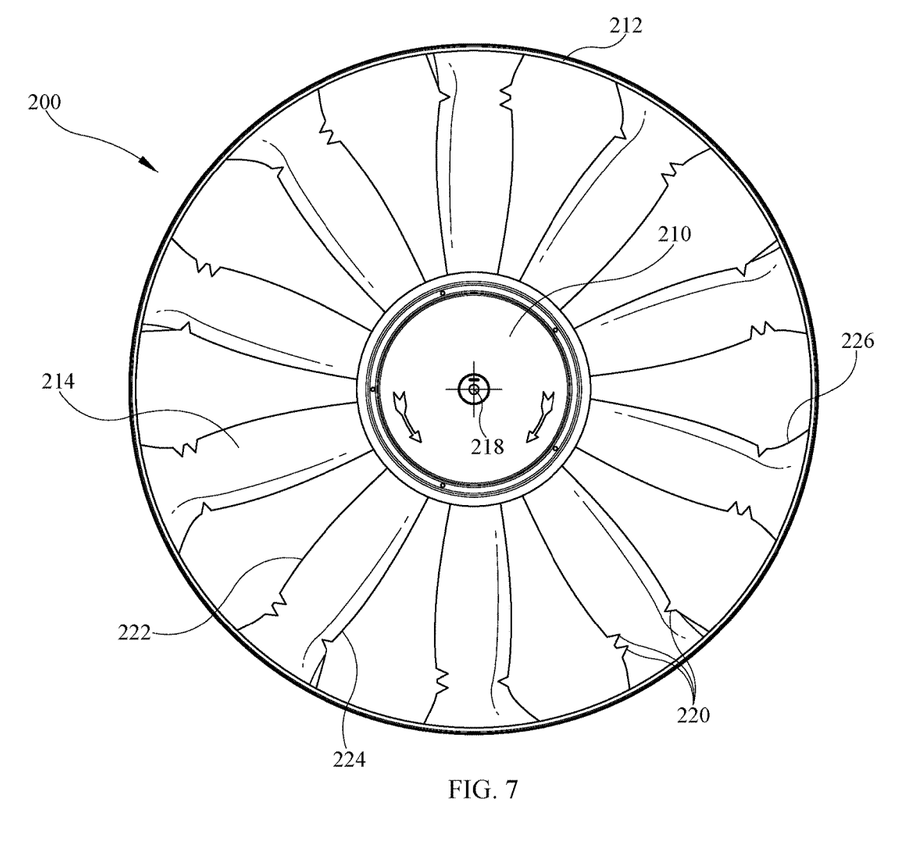
FIG. 7 is a front view of another embodiment of the compact fan in accordance with the present disclosure.

Another embodiment of a compact fan design, "Design A," is shown in FIG. 7. A fan 200 includes a hub 210, an outer hoop 212, and a number of blades 214 extending radially outward from the hub 210 to the outer hoop 212 configured to rotate about a motor axis 218. The fan 200 is generally shaped like a cylinder with parallel planes defining either end of the cylinder. Many of the features of this embodiment of the fan are identical to the previous embodiment of the fan and are not described here.

While similar in blade profile and blade angle to the features of the blade 12 described above, the blade 214 includes notches 220 cut into a leading edge 222 of the blade 214 and a trailing edge 224 of the blade 214. As the overall diameter and size of the fan diminishes the fan blades become closer together, these notches 220 increase the air turbulence and the sound generated by the fan. The notches 220 are configured to reduce the noise associated with the fan 200 by causing the air flows along the suction side of the fan 200 and the pressure side of the fan 200 to mix more smoothly allowing for less air turbulence and less velocity loss of the fan, which in turn leads to a reduction in sound generated by the fan and an increase in operational efficiency of the fan. The notches 220 tend to reduce noise perceived by a listener by spreading the sound the fan 200 makes over a wider range of frequencies, which is generally less noticeable by most listeners. The notches 220 are placed on the blade 214 near the hoop 212 end of the blade 214, with one notch being cut into the trailing edge 224 and several notches of varying sizes being cut into the leading edge 222 opposite the notch on the trailing edge 224. The sizing and numbering of notches may vary and is not limited to the depicted embodiment.

The blade 214 flares out along the trailing edge 224 into a trailing fin 226 at the tip or the hoop end of the blade 214. The blades 214 do not flare out on the leading edge 222 of the blade 214. The trailing fin 226 is configured to force air at the tip of the blade downward increasing the volume of air that can be moved by the fan 200. The instant "Design A" embodiment of the compact fan design has a diameter of 11.42 inches, the fan can move about 670 CFM of air and generates 40.2 dB when the rotor is turning at approximately 1300 RPM.

Figure 8:
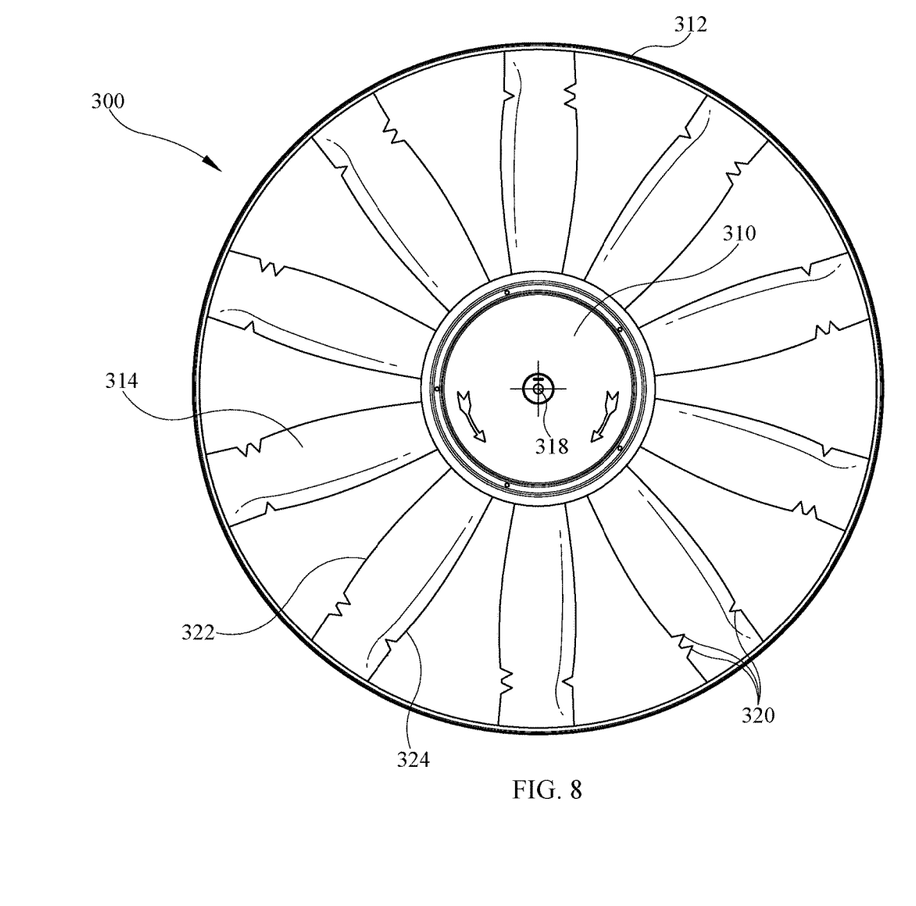
FIG. 8 is a front view of another embodiment of the compact fan in accordance with the present disclosure; and, FIG. 9 is a front view of another embodiment of the compact fan in accordance with the present disclosure.

In another embodiment of a compact fan design, "Design B," shown in FIG. 8, a fan 300 includes a hub 310, an outer hoop 312, and a number of blades 314 extending radially outward from the hub 310 to the outer hoop 312 configured to rotate about a motor axis 318.

While similar in blade profile and blade angle to the features of the blade 12 described above, the blade 314 includes a contoured shape with no fins on either edge 322, 324 of the blade 314. The blade 314 includes notches 320 cut into a leading edge 322 of the blade 314 and a trailing edge 324 of the blade 314. The notches 320 are placed on the blade near the hoop 312 end of the blade 314, with one notch being cut into the trailing edge 324 and several notches of varying sizes being cut into the leading edge 322 opposite the notch on the trailing edge 324.

The "Design B" embodiment of the compact fan design has a diameter of 11.42 inches, the fan can move, on average, 700.98 CFM of air when the rotor is turning at maximum RPM, and the fan generates, on average, 41.64 dB of sound when the rotor is turning at maximum RPM.

Figure 9:
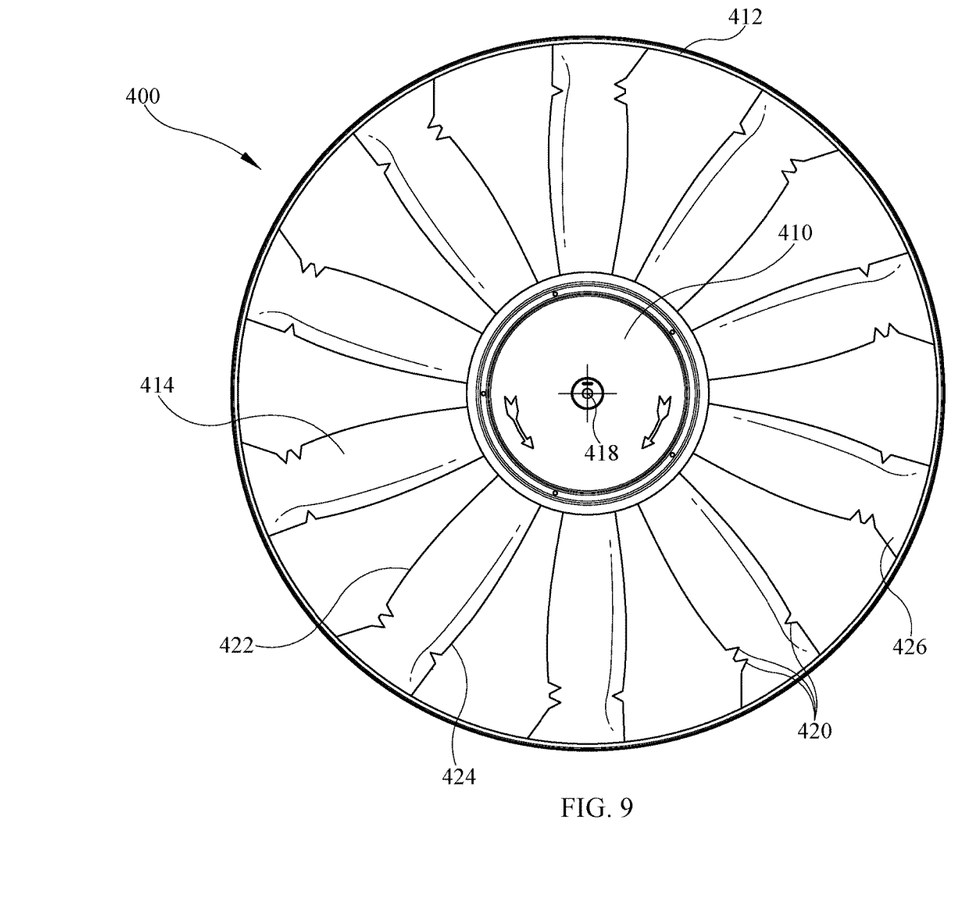

In yet another embodiment of a compact fan design, "Design C," shown in FIG. 9, a fan 400 includes a hub 410, an outer hoop 412, and a number of blades 414 extending radially outward from the hub 410 to the outer hoop 412 configured to rotate about a motor axis 418. While similar in blade profile and blade angle to the features of the blade 12 described above, the blade 414 includes some design differences over the blade 12. The blade 414 includes notches 420 cut into a leading edge 422 of the blade 414 and a trailing edge 424 of the blade 414. The notches 420 are placed on the blade near the hoop 412 end of the blade 414, with one notch being cut into the trailing edge 424 and several notches of varying sizes being cut into the leading edge 422 opposite the notch on the trailing edge 424.

The blade 414 flares out along the leading edge 422 into a leading fin 426 at the tip of the blade, or the hoop end of the blade. However, the blade 414 does not flare out on the trailing edge 424 of the blade 414. The leading fin 426 is configured to force air at the tip of the blade downward increasing the volume of air that can be moved by the fan 400.

The "Design C" embodiment of the compact fan design has a diameter of 11.42 inches moves about 688.4 CFM of air and produces about 39.33 dB of sound when the rotor is turning at approximately 1300 RPM.

Table I, shown below, compares the results of testing of the various alternative fan designs and includes information regarding the volume of air moved by each fan design and the sound generated by each fan design.

TABLE 1

| Fan Design | Average Air Movement at Approx. 1300 RPM (CFM) | Average Sound Level at Maximum RPM (dB) |
| --- | --- | --- |
| Previous Fan Design | 694.2 | 37.5 |
| Illustrative Fan Design | 711.9 | 36.6 |
| Design A | 670.5 | 40.2 |
| Design B | 701.0 | 41.6 |
| Design C | 688.4 | 39.3 |

The results from the testing of the previous fan design serve as the baseline for comparing all of the other fan designs' test results. The previous fan design has an overall diameter of 12.15 inches, can move 694.2 CFM of air while the rotor is turning at approximately 1300 RPM, and generates 37.5 dB of sound while the rotor is turning at maximum RPM.

Table 1 shows that the fan 10 achieves improvements over the prior art and other potential embodiments. Namely, the illustrative fan has a reduced diameter; moves more air, and generate less sound than the previous fan design. The disclosed fan 10 is 11.42 inches in diameter, making it 6% smaller than the prior art fan design; the fan 10 moves 17.8 CFM more air than the prior fan design, meaning it moves 2.6% more air than the prior art fan design; and the fan 10 generates 0.9 dB less than the prior art fan design, making it 2.4% quieter than the prior art fan design.

Although certain illustrative embodiments have been described in detail above, variations and modifications exist within the scope and spirit of this disclosure as described and as defined in the following claims.

The invention claimed is:

1. A fan design comprising:
   a plurality of fan blades, each fan blade with a first end and a second end, the first end configured to couple to a hub of a fan and the second end configured to couple to a hoop of the fan;
   a leading edge extending between the first end and the second end near a motor side of the fan;
   a trailing edge extending between the first end and the second end near a cover side of the fan, said trailing edge having a relief indent and a trailing edge fin which flares outward away from a central axis of each fan blade;
   wherein said trailing edge fin of a first blade of the plurality of blades and said trailing edge fin of a second blade of the plurality of blades have alternating edge angles that differ in angle at said first blade from said second blade;
   further wherein each fan blade has a first blade width and a first blade angle at the first end, and a second blade width and a second blade angle at the second end wherein said first blade angle and said second blade angle are measured relative a horizontal.

2. The fan design of claim 1, further comprising a leading edge fin that flares out from the leading edge of each fan blade near the second end configured to force air toward the trailing edge of the fan when the fan is rotating in a forward direction.

3. The fan design of claim 1, further wherein said trailing edge fin that flares out from the trailing edge of each fan blade near the second end is configured to force air away from the fan when the fan is rotating in a forward direction.

4. The fan design of claim 1, further comprising a leading edge fin that flares out from the leading edge of each fan blade near the second end configured to force air toward the trailing edge of the fan when the fan is rotating in a forward direction and a trailing fin that flares out from the trailing edge of each fan blade near the second end configured to force air away from the fan when the fan is rotating in a forward direction.

5. The fan design of claim 1, further comprising a number of notches cut into the leading edge near the second end of each fan blade, and a notch cut into the trailing edge near the second end of each fan blade, wherein the notches are configured to reduce the air turbulence experienced by the fan as the fan slices through the air.

6. The fan design of claim 5, further comprising at least one notch cut into the trailing edge near the second end of each fan blade.

7. The fan design of claim 1, wherein the second blade width is larger than the first blade width.

8. The fan design of claim 1, wherein each fan blade is progressively contoured as it extends from the first end to the second to form a continuous blade.

9. The fan design of claim 1, wherein the first blade angle is different than the second blade angle.

10. The fan design of claim 1, wherein the leading edge includes a first relief indent near the second end, wherein the first relief indent defines a point where the leading edge flares outward away from the central axis of each fan blade defining a leading fin.

11. The fan design of claim 10, wherein the leading edge has a convex shape as it extends from the first end to the first relief indent.

12. The fan design of claim 1, wherein the trailing edge includes a second relief indent near the second end, wherein the second relief indent defines a point where the trailing edge flares outward away from the central axis of each fan blade defining a trailing fin.

13. The fan design of claim 12, wherein the trailing edge has a convex shape as it extends from the first end to the second relief indent.

14. The fan design of claim 1, wherein a cross-section of each fan blade at the second end is arcuate in shape and extends between a motor side of the hoop and a cover side of the hoop at the second blade angle, and wherein a cross-section of each fan blade at the first end is bulbous in shape and extends between a motor side of the hub and a cover side of the hub at the second blade angle.

15. A fan comprising:
   a central hub having a generally annular shape and having a hub radius configured to rotate about a motor axis;
   an outer hoop having a annular shape and having a hoop radius configured to rotate about the motor axis, the hoop radius being larger than the hub radius, wherein the central hub and the outer hoop are coplanar and each has a motor side and a cover side that is away from the motor side; and
   a plurality of blades extending from the central hub to the outer hoop, wherein the plurality of blades are progressively contoured as they extend from the hub to the hoop, each of the blades including a first end and a second end, the first end configured to couple to the central hub and the second end configured to couple to the outer hoop, a leading edge extending between the first end and the second end near the motor side of the fan, and a trailing edge extending between the first end and the second end near the cover side of the fan;
   said trailing edge of each of said blades having a relief indent and a trailing edge fin which flares outward away from a central axis of the blade;
   wherein said trailing edge fin of a first blade of the plurality of blades and said trailing edge fin of a second blade of the plurality of blades have alternating differing edge angles.

16. The fan of claim 15, wherein the central hub defines a hub height distance between the motor side and the cover side of the fan, and the outer hoop defines a hoop height distance between the motor side and the cover side of the fan, wherein the hoop height is equal to the hub height.

17. The fan of claim 16, wherein the plurality of blades have a blade width, wherein the blade width is larger than the hub height.

18. The fan of claim 15, wherein the plurality of blades extend from the motor side of the hub to the cover side of the hub at a first blade pitch angle, the first blade pitch angle configured to move air from one side of the fan to another side of the fan.

19. The fan of claim 15, wherein the plurality of blades extend from the motor side of the hoop to the cover side of the hoop at a second blade pitch angle, the second blade pitch angle configured to move air from one side of the fan to another side of the fan.

20. The fan of claim 15, wherein a hub height is smaller than a hoop height, wherein the motor side of the hub is parallel with and coplanar with the motor side of the hoop, and wherein the cover side of the hub is parallel with the cover side of the hoop.

21. The fan of claim 15, said trailing edges of adjacent blades having trailing edge fins with different angles.

\* \* \* \* \*